United States Patent [19]
Bailie

[11] 4,356,785
[45] Nov. 2, 1982

[54] TRANSPORTABLE PROCESS MODULES

[76] Inventor: Robert E. Bailie, 2110 SW. 28th Way, Fort Lauderdale, Fla. 33312

[21] Appl. No.: 968,629

[22] Filed: Dec. 12, 1978

[51] Int. Cl.³ ............................ B63C 1/00; B63C 3/00
[52] U.S. Cl. .................................... 114/264; 114/266; 114/263; 202/83; 203/10; 405/219
[58] Field of Search ................... 405/195, 219; 9/8 P, 9/25; 203/D24, 10, 11; 202/83; 159/15 F; 114/264–267, 72, 73, 75, 77 R, 77 A

[56] References Cited

U.S. PATENT DOCUMENTS

| | | | |
|---|---|---|---|
| Re. 30,040 | 7/1979 | Kirby | 114/72 |
| 1,311,700 | 7/1919 | Lanchester | 114/264 |
| 2,210,896 | 8/1940 | Brush | 114/72 |
| 3,410,339 | 11/1968 | Wiegandt | 203/10 |
| 3,440,146 | 4/1969 | Louw | 114/270 |
| 3,776,169 | 12/1973 | Strecker | 114/75 |
| 3,785,314 | 1/1974 | Scanlan | 114/266 |
| 4,077,350 | 3/1978 | Nishino | 114/72 |

Primary Examiner—Edw. R. Kazenske
Assistant Examiner—D. W. Keen
Attorney, Agent, or Firm—Eugene F. Malin

[57] ABSTRACT

The present invention relates to process modules designed for interconnection during shipment as well as installation. The process modules may be of a single deck design adapted to be stacked and transported on specially designed ships, as in LASH vessels, or the process modules may be of a design that is connectable to a specially designed ship as a part of the ship's hull. Fabrication of the process modules is performed at a shipyard facility. The completely fabricated modules are transportable in an assembled manner to a remote plant site aboard a LASH barge vessel or other special vessel where the modules are again assemblied either as a floating or land-based process plant installation.

5 Claims, 10 Drawing Figures

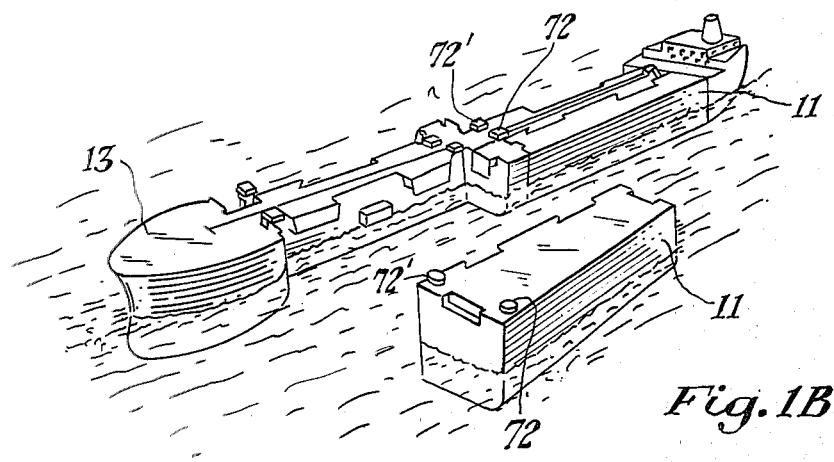
Fig. 1B.
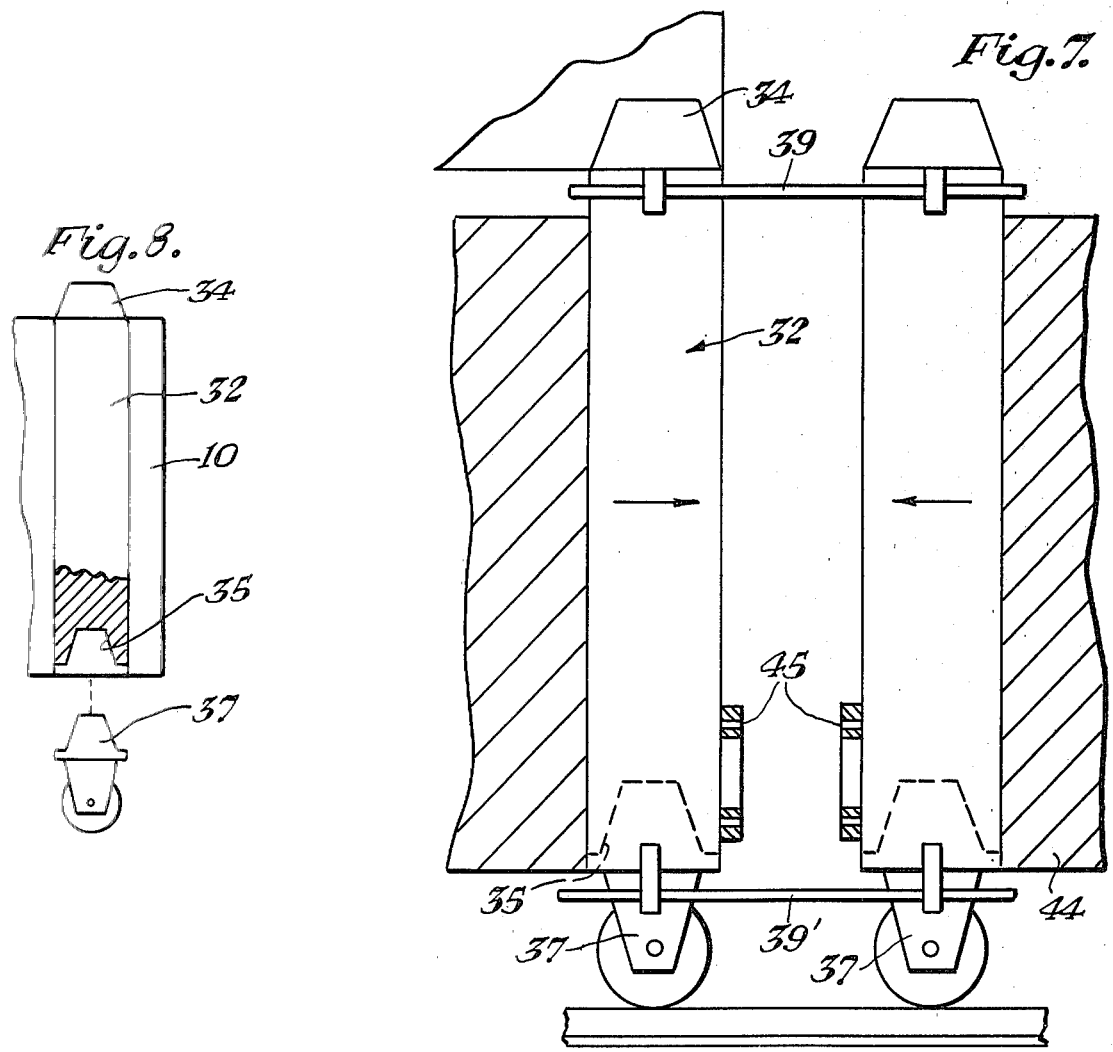
Fig. 8.
Fig. 7.

TRANSPORTABLE PROCESS MODULES

BACKGROUND OF THE INVENTION

This invention relates to process vessels or modules which are designed for interconnection for shipment as well as designed for becoming an integral part of a land-based or floating process plant installation. In particular, this invention may relate to sea water evaporator systems comprised of modules adapted to be assembled and transported on specially designed LASH ships, along with other LASH barges, or adapted to be connectable as a part of the hull of a specially designed ship. Then thereafter to be assembled or connected into an installation with the same container configuration.

Heretofore, construction of process plants, evaporator systems, petro-chemical systems or the like presented incredible logistics and manpower problems. Usually these plants, such as a typical 10 MGD multi-stage flash (MSF) or vertical tube evaporator (VTE) system for desalinating sea water are constructed in developing countries with ill-equipped or limited field construction facilities. Since the plants require extensive field fabrication and welding operations under adverse conditions, this often requires tremendous support systems for the welding crews.

Various modular designs of evaporator vessels have been proposed which would reduce field fabrication and welding operations. However, these modular designs have increased the problems in handling and transporting the massive subassemblies from their manufacturing location to their assembly location.

Further, designs have been proposed for the construction of the entire desalting facility on a single floating platform as shown in U.S. Pat. No. 3,440,146. The disadvantage of the floating platform is that the desalting plant must remain a floating plant or a fixed offshore facility.

The present invention relates to the design of process modules that allows manufacture in industrial nations for ease of shipment to and ease of assembly in a rural community.

BRIEF SUMMARY OF THE INVENTION

The present invention relates to a new and improved modular design of process vessels that may be floatable, such as desalination evaporator modules which may be easily assembled and transported aboard a specially designed carrier to a costal site, for reassembly and utilization in either a floating facility, a platform facility, or a land-based facility. The modular design of one embodiment of the present invention is in the form of a LASH barge, or other standard shipping container. Another embodiment is in the form of a connectable part of the hull of a transporting ship. The modular design solves the previously mentioned problem of handling massive modular sub-assemblies of the total evaporator vessel which might typically be 200 feet long for a 5 MGD multi-stage flash (MSF) evaporator system.

The modular design utilizes the container as both the shipping container and the installation container or body of the process module and interconnecting means utilized in transportation assembly as well as installation assembly.

The present invention also eliminates the problem of the floating platform plant, in that the present modules may be assembled in the water and remain as a floating plant site without the need of a separate platform or may be assembled and installed as a land-based facility.

It is an object of this invention to provide a desalination, petro-chemical or other process plant at a substantial reduction in construction cost by use of a dual shipping-installation body for each module with shipping-installation connection means.

It is another object of this invention to provide a facility that may be modularly manufactured in one area where modern assembly line shipyard techniques are available and then shipped aboard a LASH carrier or other containerized cargo carrying vessel or shipped as part of the hull of a specially designed ship, to another remote area for final assembly into an operating process plant.

Still another object of this invention is to provide a multi-stage flash (MSF) evaporator system of single or multiple deck design which can contain a number of evaporator modules of LASH configuration, other standard shipping container configuration, or specially designed hull configuration. The (MSF) evaporator system can thereafter again be assembled after shipment to a remote site with minimum field fabrication and welding operations.

A further object of this invention is to provide a desalination facility that may be repaired in a minimum time by replacing a defective module quickly with a spare module of a standardized configuration or of a specially designed hull configuration.

In accordance with these and other objects which will be apparent hereinafter, the instant invention will now be described with particular reference to the accompanying drawings.

BRIEF DESCRIPTION OF THE DRAWINGS

FIG. 1-B is a perspective view of the modules of the present invention as a detachable hull.

FIG. 7 is an elevation of one compression fixture arrangement for joining adjacent modules of the present invention.

FIG. 8 is a fragmentary elevation of a support member illustrating a detachable wheel assembly.

DESCRIPTION OF THE PREFERRED EMBODIMENT

Figure 1A:
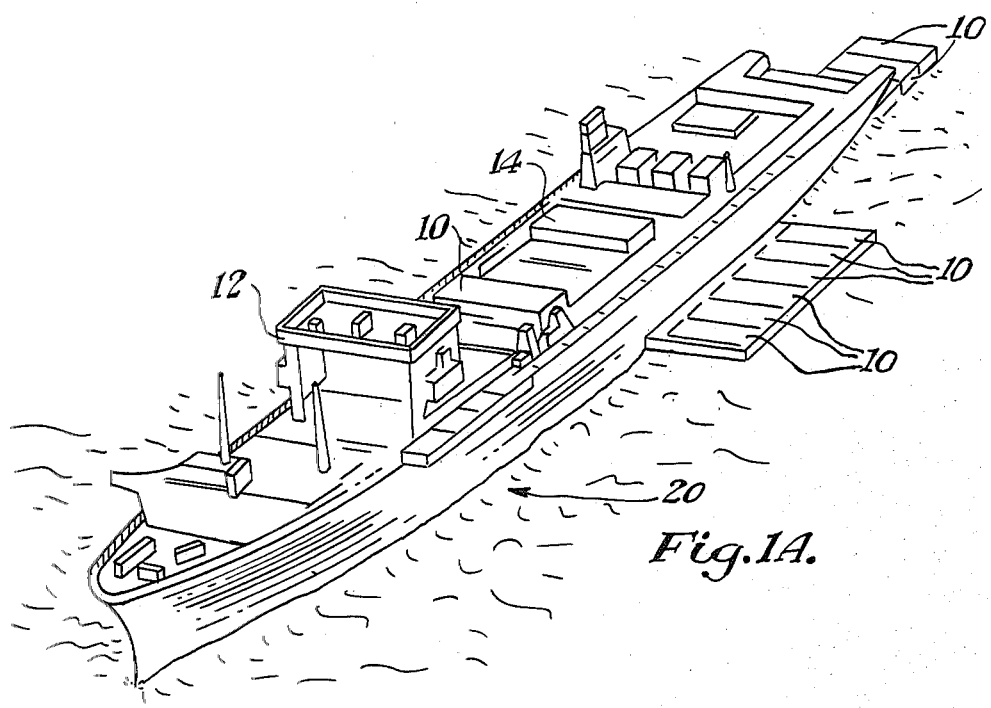
FIG. 1-A is a perspective view of a LASH carrier, carrying standard LASH lighters and modules of the present invention.

Referring now to the drawings, FIG. 1-A illustrates a LASH carrier 20 (LASH being an acronym for Lighter Aboard Ship; the lighter commonly referred to as a barge) being loaded with evaporator modules 10 by means of an on-board crane 12. The evaporator modules 10 are designed to conform to the basic dimensions of a LASH barge and may be stacked together on the LASH carrier 20 and thus are transported aboard the LASH carrier 20 along with standard LASH barges 14. The evaporator modules are designed to also be stacked directly on the carrier 20 as described below.

FIG. 1-B illustrates extremely large process modules 11 being connected to a specially designed ship 13 for transportation as part of the ship's hull. The process modules 11 may be secured to the ship 13 by support connecting means 72 and 72'. Such ships are described in detail in U.S. Pat. No. 3,841,254, which is incorporated as part of this disclosure to show one type of connecting detail.

The evaporator modules 10, as illustrated in FIGS. 2, 3, and 4 and FIGS. 7 and 8, are provided near each of the corners thereof with vertical support means 32. The support means 32 extend slightly above the top deck plane 42 and slightly below the bottom plane 44 of said evaporator module 10. The upper portion 34 of each support means 32 is generally cone or frustrum-shaped, while the lower portion has a concave recess 35 which is complementary to and mates with the upper cone portion 34 of a lower module or a similar member on the LASH carrier of FIG. 1-A. Thus, the cone-shaped upper portion 34 of an underlying stackable evaporator module or LASH barge will align within the concave recesses of an uppermost evaporator module or LASH barge as illustrated in FIG. 7.

Figure 2:
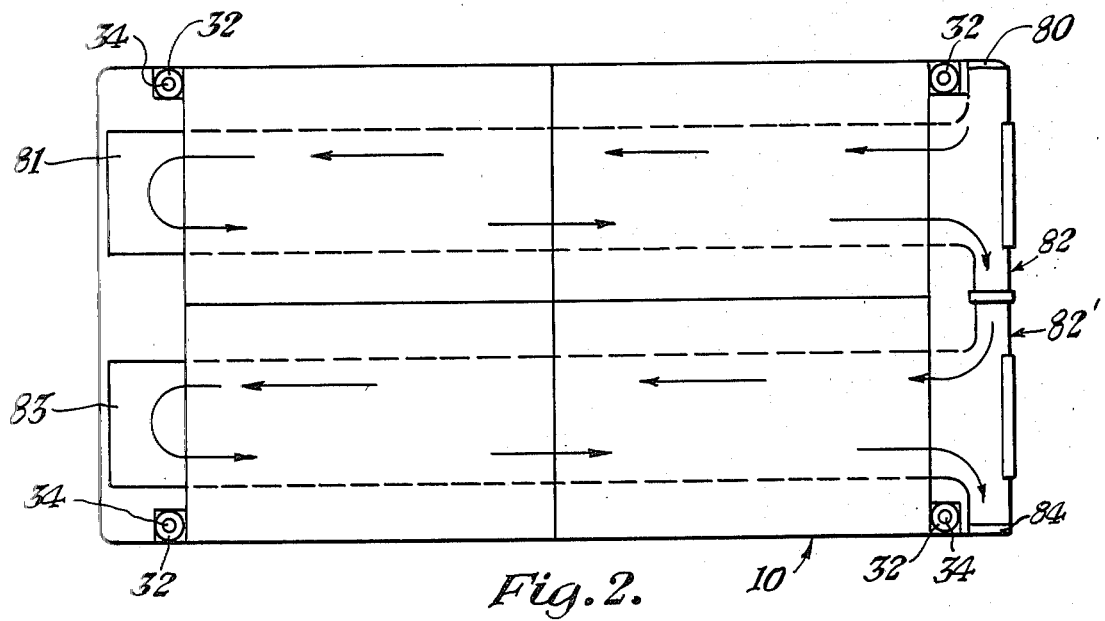
FIG. 2 is a top plan view of an evaporator module of the present invention showing typical condenser water boxes and brine flow through condenser tube bundles for a four stage module.
Figure 3:
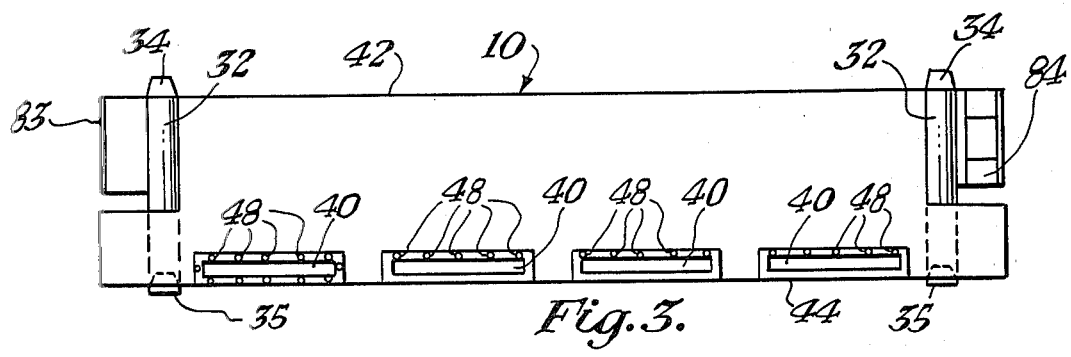
FIG. 3 is a side elevation of the evaporator module shown in FIG. 2.

FIG. 2 shows the inlet brine connection 80 and indicates the brine flow through the condenser tube bundle to waterbox 81 that reverses the flow to waterbox 82 that connects with the adjacent waterbox 82'. The brine then flows through additional tube bundles, through waterbox 83, to brine outlet connection 84 that is connectable to another module. The flashing brine from module to module, flows through brine connections 40, as is well known in the art. These openings are connectable to adjacent modules as set forth hereinbelow. These openings 40 are covered by a plate using bolt opening 48 (not shown) during shipment as shown in FIG. 1A. The plates are removed before connecting to adjacent modules.

FIGS. 7 and 8 illustrate the support means 32 utilizing heavy duty wheel assembly 37 engageable with the concave recess 35 for easily moving the modules 10. Compression fixtures 39 and 39' are removably attached to the modules 10 for pulling the modules together for site assembly or for assisting in securing the modules against movement while in transit aboard the LASH carrier.

Figure 9:
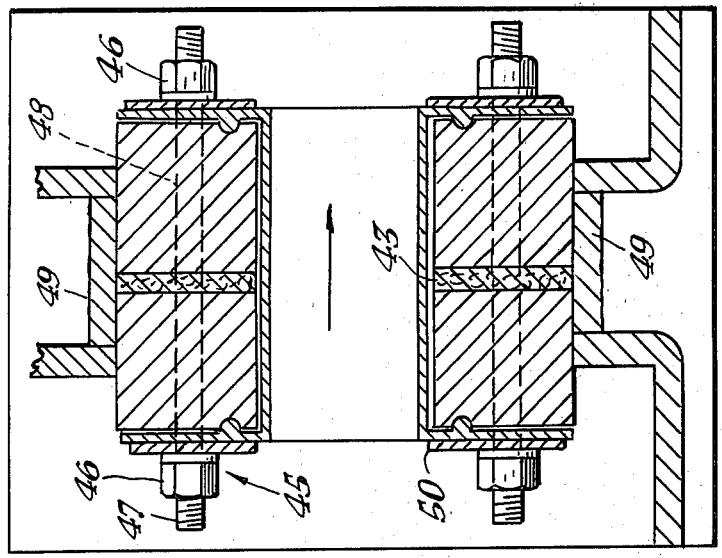
FIG. 9 is a sectional detail view of a typical brine connection after the two modules of FIG. 7 are field assembled as in FIG. 5.

The assembled modules are held together as part of an installation by a fastening means 45 as shown in FIGS. 7 and 9. The fastening means 45 includes nuts 46 and bolts 47 in bolt openings 48 with a gasket 43 therebetween. The exterior of the joint may be made air and water tight with shellac or other suitable sealing material 49. Sealing connecting means 50 is in the form of a flanged rectangular connector about the interior of the brine opening of adjacent modules.

Figure 5:
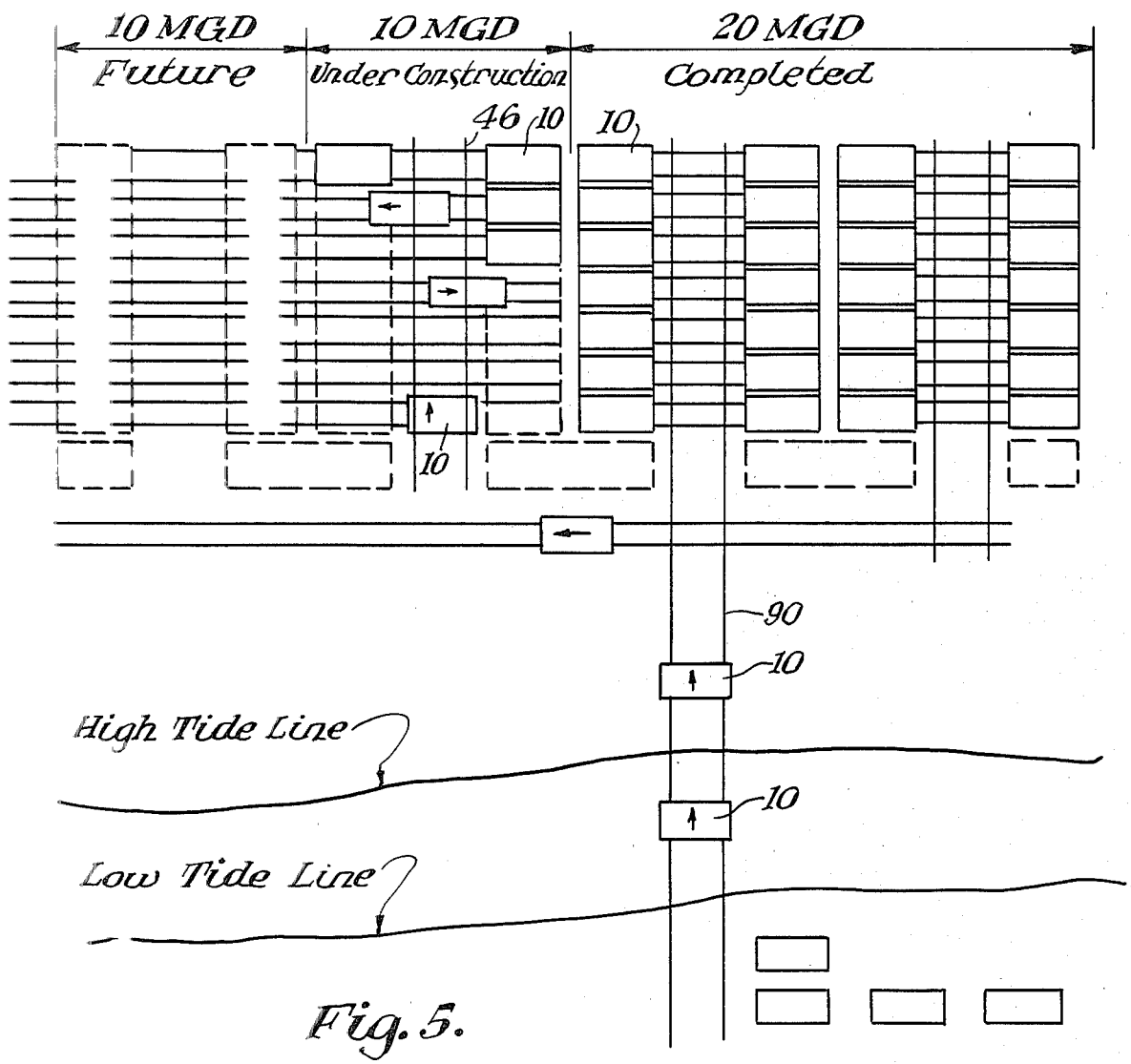
FIG. 5 is a plan view of a desalination facility using a plurality of the evaporator modules as shown in FIG. 2.
Figure 4:
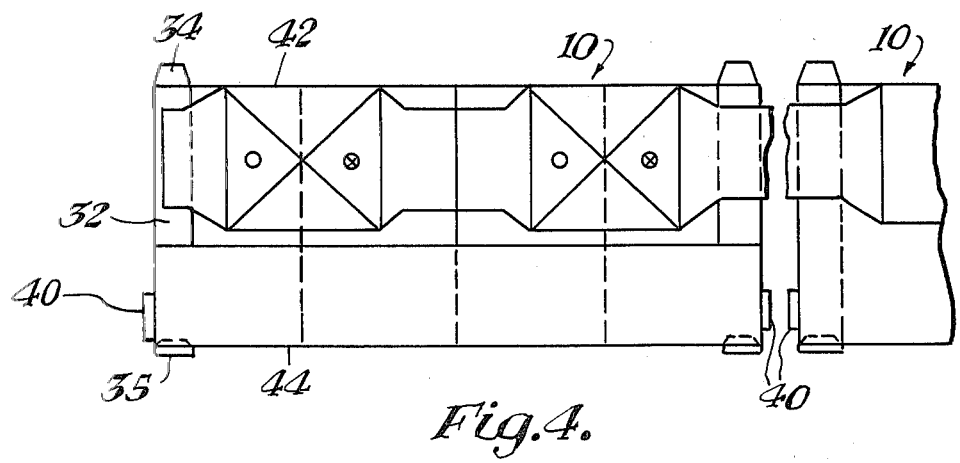
FIG. 4 is an end elevation of the evaporator module shown in FIG. 2.

FIG. 5 illustrates a typical Multi-Stage Flash evaporator site with a plurality of evaporator systems. In this instance, each system 40 is comprised generally of seven evaporator modules 10 which when combined in series, forms a typical 5 MGD MSF Evaporator system of 28 stages (approximately 220'×60'×13'). For illustrative purposes, FIG. 5 shows a total site capacity of 40 MGD, with 20 MGD completed, 10 MGD under construction and 10 MGD planned for future expansion. Each module 10 may be delivered directly from the LASH carrier 20 to the plant site either by hydraulically operated "walking transporters" (not shown) or by a track system 90, using the wheel assemblies 37 inserted in concave recess 35. The track system 90 allows rapid removal and replacement of evaporator modules 10, thus decreasing down time of the system for major repairs.

Figure 6:
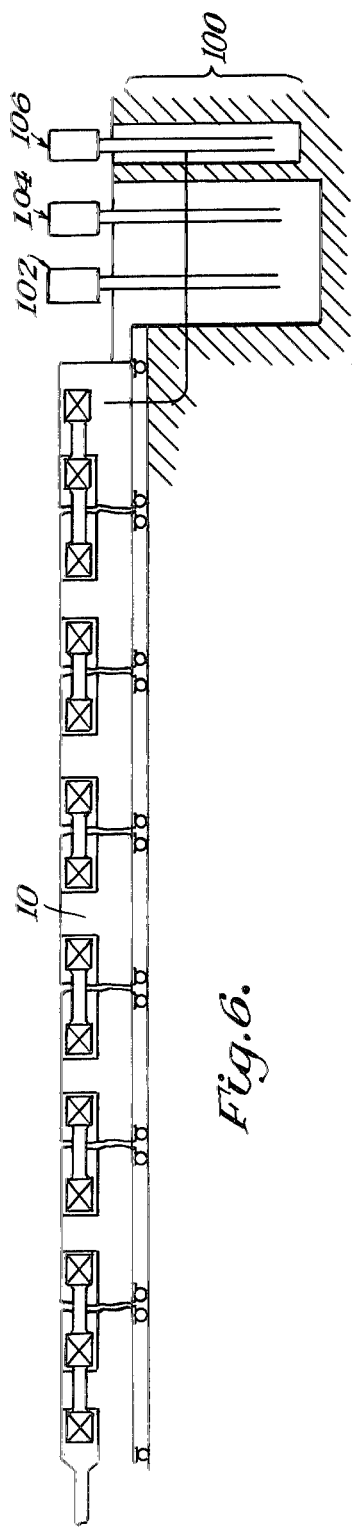
FIG. 6 is a partial elevation of a multi-stage flash evaporator system using a plurality of evaporator modules as shown in FIG. 2.

FIG. 6 illustrates a typical 5 MGD MSF Evaporator system of 28 stages (each module 10 arranged with four stages as shown in FIG. 2). The evaporator system in the illustrated embodiment remains at ground level and is shown utilizing a brine recirculation type of process design, although the present invention may be applicable to all known process designs such as the "once through" MSF system. The illustrated embodiment utilizes previously prepared pittype pumping systems 100 for the brine recycle pump 102, the brine blowdown pump 104 and the distillate pump 106. The evaporator system may also be used in a dredge and back fill arrangement, wherein the modules may be floated onto a prepared surface and the area would be drained and filled to land lock the system after assembly into an installation.

The evaporator system may also be used in a multiple deck design or stacked configuration, or in an offshore platform arrangement, wherein the modules are floated onto a submerged platform which is then floated and elevated above the sea surface on hydraulic jacks as routinely applied to offshore drilling platforms.

Various systems and processing equipment may be used such as vertical tube evaporators, inclined plate separators, power plant surface condensers, petrochemical plant heat exchangers or any item of process equipment that can be advantageously designed in the shape of a standard size shipping container module.

The instant invention has been shown and described herein in what is considered to be the most practical and preferred embodiment. It is recognized, however, that departures may be made therefrom within the scope of the invention and that obvious modifications will occur to persons skilled in the art.

What I claim is:

1. A sea water desalting evaporator system, comprising:

a generally floatable rectangular self-contained evaporator means having side walls substantially 61 feet in length and 13 feet in height, front and rear wall members substantially 31 feet in width and 13 feet in height, and top deck and bottom hull members substantially 61 feet by 31 feet for transportation aboard a LASH barge carrier;

a first conduit means disposed within said evaporator means for the flow of a first fluid therethrough and to a like evaporator means;

a plurality of vertically extending support means for fastening said evaporator means aboard said LASH carrier, said support means projecting slightly above said top deck member and below said bottom hull member;

a second conduit means disposed within said evaporator means for the flow of a second fluid therethrough and to a like evaporator means.

2. A sea water desalting evaporator system as set forth in claim 1, wherein:

said vertically extending support means has a cone-shaped upper portion and a complementary concave-conical recessed lower portion for axial alignment of said evaporator means when stacked one upon another.

3. A sea water desalting evaporator system as set forth in claim 2, wherein:
said concave-conical recessed lower portion has wheel means removeably attached thereto for moving said evaporator means on a track means from a floating position in the sea to a remote land site.

4. A sea water desalting evaporator system as set forth in claim 1, wherein:
said first conduit means of each evaporator means is connected in series.

5. A sea water desalting evaporator system as set forth in claim 1, further comprising:
a connecting means secured to said vertically extending support means for removably connecting said evaporator means to like evaporator means for transportation aboard a LASH barge carrier and for connecting said evaporator means to like evaporator means for assembly of said desalting evaporator system.

* * * * *